United States Patent

[11] 3,570,408

| [72] | Inventor | Richard L. Lich<br>Town and Country, Mo. |
|---|---|---|
| [21] | Appl. No. | 771,864 |
| [22] | Filed | Oct. 30, 1968 |
| [45] | Patented | Mar. 16, 1971 |
| [73] | Assignee | General Steel Industries, Inc.<br>Granite City, Ill. |

[54] BOLSTERLESS TRUCK HAVING PIVOTALLY CONNECTED SIDE FRAME
9 Claims, 3 Drawing Figs.

[52] U.S. Cl............................................. 105/133,
105/199, 105/202, 105/206, 105/208
[51] Int. Cl........................................ B61c 3/00,
B61f 3/04, B61f 5/02
[50] Field of Search............................................ 105/193,
197, 208.1, 208.2; 105/133, 199, 202, 206, 208

[56] References Cited
UNITED STATES PATENTS

| 2,477,517 | 7/1949 | Haynes.......................... | 105/208 |
| 2,907,282 | 10/1959 | Erzer............................. | 105/193X |
| 2,934,028 | 4/1960 | Travilla......................... | 105/193X |
| 2,950,689 | 8/1960 | Rossell.......................... | 105/133 |
| 3,286,656 | 11/1966 | Lich.............................. | 105/133X |
| 3,403,638 | 10/1968 | Hirst............................. | 105/199 |

Primary Examiner—Arthur L. LaPoint
Assistant Examiner—Howard Beltran
Attorney—Bedell and Burgess ABSTRACT: A railway truck comprising a pair of wheeled axles, separate side frames supported at their ends on the axles and each having transverse inboard extensions offset longitudinally of the truck from each other on opposite sides of the transverse centerline of the truck and terminating adjacent the other side frame, the terminals of each extension being pivotally connected to the opposite side frame on the transverse axis of the truck, upright combined pneumatic and elastomeric springs carried by the side frames on outboard brackets for directly supporting a vehicle body, and draft-transmitting means for connecting said extensions to the vehicle body at the center of the truck to accommodate transverse vertical and swivel movements of the body relative to the truck while preventing relative longitudinal movements therebetween. The long rigid transverse arms formed by the side frame inboard extensions resist tendencies of the side frames to tilt transversely and thus permits wide spacing of the body support springs on side frame outboard brackets, and provides a stable support for motors, driving gear boxes and the like.

Patented March 16, 1971

3,570,408

INVENTOR:
RICHARD L. LICH

Bedell & Burgess

BY ATTORNEYS

# 3,570,408

BOLSTERLESS TRUCK HAVING PIVOTALLY CONNECTED SIDE FRAME

BACKGROUND OF THE INVENTION

1. Field of the Invention

The invention relates to railway rolling stock and consists particularly in an equalized railway vehicle truck of the bolsterless type.

2. Description of the Prior Art

The prior art includes bolsterless trucks in which upright body support springs are carried on the sides of the truck frame and trucks having separate side frames connected to each other for relative pivotal movements about a transverse axis with transverse bolsters supported on upright springs carried by the side frames, and having a swivel bearing on the bolster at its center for supporting a vehicle body.

SUMMARY OF THE INVENTION

The invention provides a bolsterless truck having separate side frames pivoted to each other, on a common transverse axis at widely spaced points to achieve full equalization, and positive tramming widely spaced body support springs on the side frames, and a centering device connecting the truck to a supported car body for freely accommodating relative vertical, transverse and swivel movements therebetween while preventing substantial longitudinal movements therebetween.

DESCRIPTION OF THE PREFERRED EMBODIMENT

Figure 1:
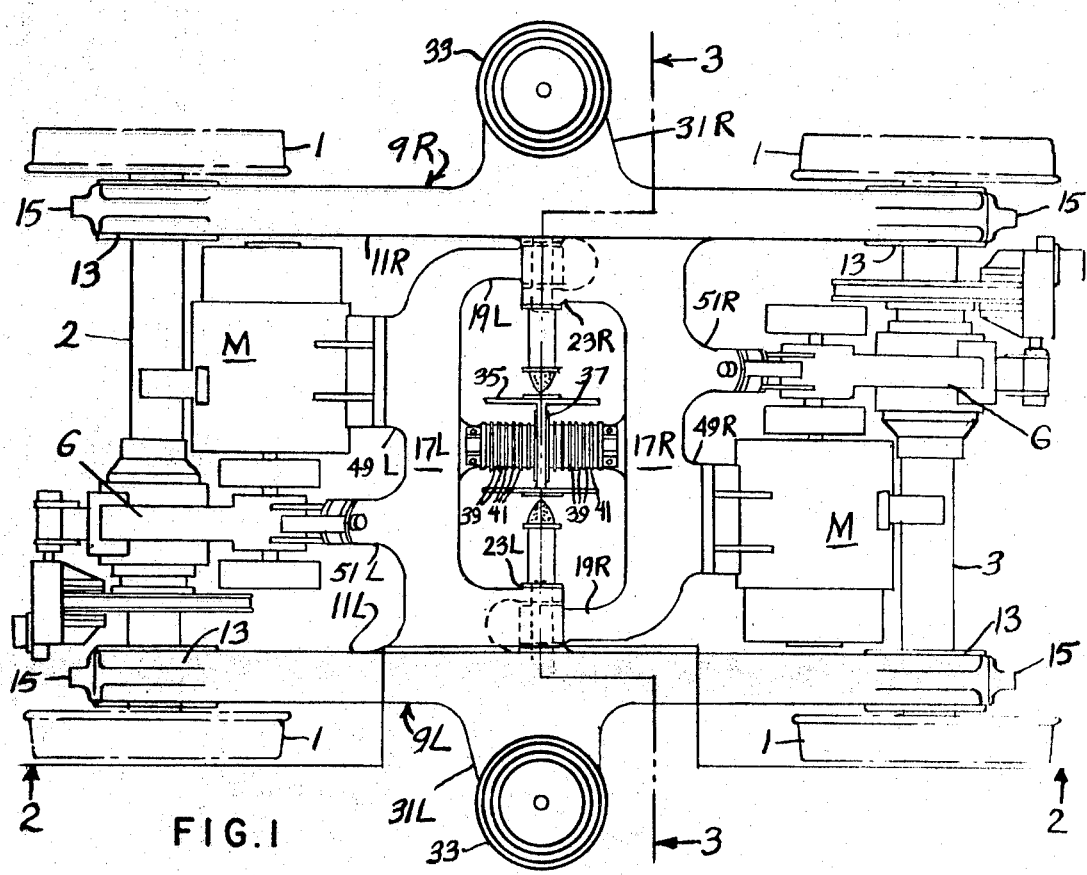
FIG. 1 is a plan view of a railway vehicle truck embodying the invention.
Figure 2:
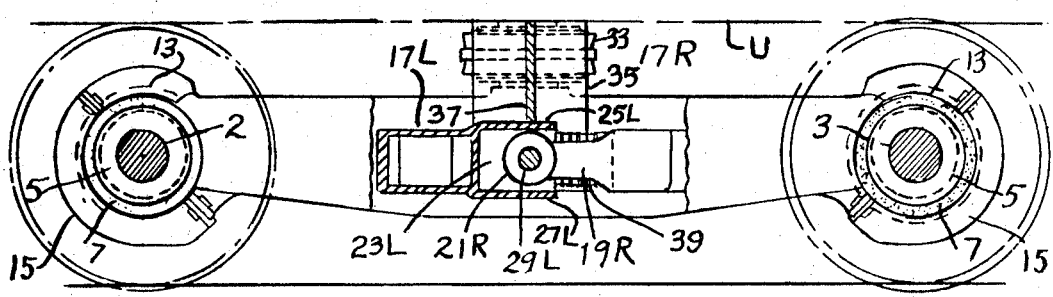
FIG. 2 is a side elevation, partially in section along line 2—2 of FIG. 1.
Figure 3:
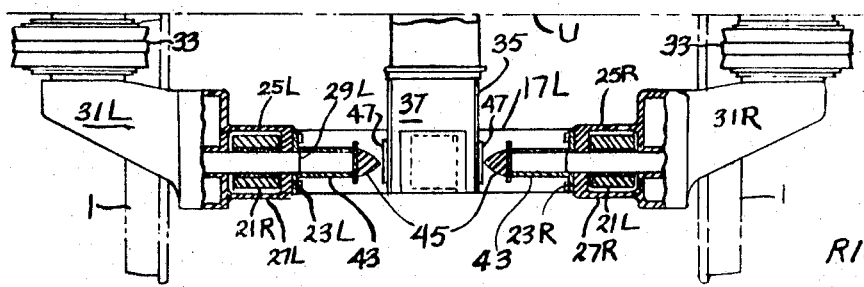
FIG. 3 is a transverse vertical sectional view along line 3—3 of FIG. 1.

The numeral 1 refers to railway flanged wheels mounted in spaced pairs on spaced parallel axles 2 and 3.

Inboard of wheels 1, axles 2 and 3 are journaled in cylindrical journal boxes 5, which are surrounded by elastomeric grommets 7.

Side frames 9L and 9R comprise longitudinally extending box section beams 11L and 11R spaced apart transversely of the truck and having concave end portions 13 in which grommets 7 are received, and semicircular end caps 15 are secured to side frame ends 13 to complete the encirclement of grommets 7, holding the latter in compressed relation about their associated journal boxes 5. The concave surfaces of side frame end portions 13 and end caps 15 and the peripheries of journal boxes 5 are annularly grooved in known manner to receive grommets 7 and prevent their movement transversely of the side frames and journal boxes and thus prevent substantial transverse movement of the journal boxes with respect to the side frames.

For maintaining the truck in tram, side frames 9L and 9R are formed respectively with transverse inboard extensions 17L and 17R, which are offset longitudinally of the truck in opposite directions from the transverse centerline of the truck, and their free end portions 19L and 19R respectively are bent toward each other, with their terminals 21L and 21R centered about the transverse centerline of the truck.

At the centers of the truck side frames 9L and 9R are formed respectively with inboard brackets having longitudinally extending vertical webs 23L and 23R spaced inwardly from the side frames and connected along their upper and lower margins to the latter by vertically spaced horizontal top and bottom webs 25L and 27L and 25R and 27R respectively to form pockets open at one end to receive the terminals 21R and 21L respectively of side frame extensions 17R and 17L. The other ends of inboard brackets 23, 25, 27 merge with the respective side frame extensions 17L and 17R. Bracket webs 23L and 23R, and side frame beams 11L and 11R are formed with registering circular openings on the transverse centerline of the truck to receive transversely extending pins 29L and 29R respectively, which pass through and are journaled in terminals 21L and 21R respectively of side frame extensions 17L and 17R, so that the side frames can tip with respect to each other about the common transverse axis of pins 29L and 29R to accommodate to differing vertical irregularities of the opposite track rails without varying the wheel loading.

Side frames 9L and 9R are formed with outboard brackets 31L and 31R intermediate their ends, and upright combined pneumatic and elastomeric springs 33 are seated on these brackets transversely outboard of the respective side frames and directly support underframe U, to which they are secured. Springs 33 are horizontally as well as vertically yieldable to permit relative lateral and swiveling movement of the underframe and truck. The wide lateral spacing of the springs permits the use of desirably soft springs while providing excellent roll stability.

To provide for the transmission of longitudinal draft and braking forces between the truck and underframe, while freely accommodating vertical, lateral and swivel movements of the truck with respect to underframe U, the latter is provided with a depending post 35 of H cross section, positioned at the center of the space defined by side frame extensions 17L and 17R and the opposite side frames, the web 37 of post 35 extending transversely of the truck and lying on the transverse centerline of the truck. Between web 37 and both side frame extensions are compressed laminated sandwich devices each comprising a series of transverse vertical flat elastomeric pads 39 interleaved by metal plates 41. The resistance of pads 39 to compression will effectuate the transmission of longitudinal draft and braking forces between truck side frame extensions 17L and 17R and post 35, while the shear yieldability of pads 39 will freely accommodate relative swivel, lateral and vertical movements of truck and underframe.

For limiting lateral movement of underframe U on the truck, transverse tubular brackets 43 concentric with pivot pins 29L and 29R are secured to the inner surfaces of webs 23L and 23R, and mount, at their inner extremities, beehive bumpers 45 of elastomeric material. The latter are normally in equally spaced relation from metal pads 47 on the sides of post 35.

The truck may have transverse traction motors M supported from brackets 49L and 49R on side frame extensions 17L and 17R, and the latter may have brackets 51L and 51R for supporting driving gear boxes G.

I claim:

1. In a railway vehicle truck, a pair of spaced wheeled axles, separate longitudinally extending side frames supported at their ends on said axles, each of said side frames having an inboard transverse extension, said extensions being spaced apart longitudinally of the truck from each other and each having terminals adjacent the other side frame and in substantial alignment with each other transversely of the truck, means pivotally connecting each of said side frame extension terminals to the other side frame on a common transverse axis, outboard brackets formed on the central portions of said side frames, upright springs seated on said outboard brackets for directly supporting a vehicle body, and a centering device positioned between said opposite side frame extensions and arranged for rigid connection to the supported vehicle body.

2. In a railway vehicle truck according to claim 1, said pivotal connecting means comprising a pair of aligned transversely extending pivot pins each passing through a portion of one of said side frames and one of said side frame extension terminals.

3. In a railway vehicle truck according to claim 2, said pins being secured to said side frame portions and journaled in said extension terminals.

4. In a railway vehicle truck according to claim 3, said side frames being formed with inboard brackets having vertical web portions extending longitudinally of the truck and spaced from said side frames at least the thickness of said side frame extension terminals, said pins being mounted in said side frames and said webs and extending therebetween, said terminals being received respectively between the opposite side frames and their bracket webs and there being journaled on said pins.

5. In a railway vehicle truck according to claim 4, said inboard brackets also including spaced top and bottom webs connecting said vertical webs to the respective side frames and defining, with said vertical webs and the inside surfaces of the adjacent side frames, pockets pivotally receiving said extension terminals.

6. In a railway vehicle truck according to claim 1, said centering device comprising a vertical web positioned centrally in the space defined by said side frame extensions and said side frames, and elastomeric sandwich devices compressed longitudinally of the truck between the opposite surfaces of said web and the opposing side frame extension, said vertical web being adapted to be connected at its upper end to a supported vehicle body.

7. In a railway vehicle truck according to claim 6, longitudinally oriented vertical flanges on the sides of said vertical web, and elastomeric bumpers carried by said inboard brackets and normally in transversely spaced relation from said flanges, being engageable therewith to limit lateral movement of a supported vehicle body with respect to the truck.

8. In a railway vehicle truck according to claim 1, traction motors and associated gear boxes supported from said transverse extensions in spaces between said extensions and the respectively adjacent axles.

9. In a railway vehicle truck according to claim 1, cylindrical journal boxes rotatably receiving end portions of said axles, an elastomeric grommet surrounding each journal box, and means clamping said grommets in the side frame ends to permit said side frames to tilt transversely with respect to said axles while preventing substantial longitudinal or transverse movements of said side frames with respect to said axles.